United States Patent [19]

Blazejczak et al.

[11] Patent Number: 4,990,246
[45] Date of Patent: Feb. 5, 1991

[54] SEPARATOR FOR TWO NON-MISCIBLE LIQUIDS

[75] Inventors: Jean Blazejczak, Billere; Luc Delons, Pau, both of France

[73] Assignee: Societe Nationale Elf Aquitaine, Courbevoie, France

[21] Appl. No.: 430,058

[22] Filed: Oct. 31, 1989

Related U.S. Application Data

[63] Continuation of Ser. No. 116,318, Nov. 4, 1987, abandoned.

[30] Foreign Application Priority Data

Nov. 4, 1986 [FR] France .................. 86 15337

[51] Int. Cl.$^5$ .............................................. B01D 21/24
[52] U.S. Cl. ..................... 210/109; 210/122; 210/195.1; 210/202; 210/208; 210/219; 210/221.1; 210/319; 210/320; 209/169
[58] Field of Search ............... 210/109, 122, 195.1, 210/202, 208, 219, 221.1, 319, 320, 540, DIG. 5; 209/169

[56] References Cited

U.S. PATENT DOCUMENTS

| | | | |
|---|---|---|---|
| 2,274,658 | 3/1942 | Booth | 210/540 |
| 3,140,255 | 7/1964 | Daman | 210/221.1 |
| 3,491,880 | 1/1970 | Reck | 210/221.1 |
| 3,894,949 | 7/1975 | Enzmann | 210/540 |
| 3,984,001 | 10/1976 | Nagano et al. | 209/169 |
| 4,220,544 | 9/1980 | McGrew | 210/DIG. 5 |

FOREIGN PATENT DOCUMENTS 2177581 11/1973 France .

Primary Examiner—Richard V. Fisher
Assistant Examiner—Cynthia L. Nessler
Attorney, Agent, or Firm—Oblon, Spivak, McClelland, Maier & Neustadt

[57] ABSTRACT

The present invention relates to a separator for two liquids which are not miscible, consisting of a cylindrical casing (1) in which there are active capacities (9, 10) and passive capacities (8, 35), the passive capacities (8, 35) being disposed at each of the ends of the direction of circulation (FF) of the liquid in the cylinder and serving either as a tranquilizing zone or as a decantation zone or as a buffer zone, at least two active capacities (9, 10) being connected by a common skimmer disposed in the center of the cylindrical casing (1), the active capacities (9, 10) being disposed between the passive capacities (8, 35) and being provided with a rotor-stator assembly (13, 14) adapted to carry out separation by induced air.

7 Claims, 6 Drawing Sheets

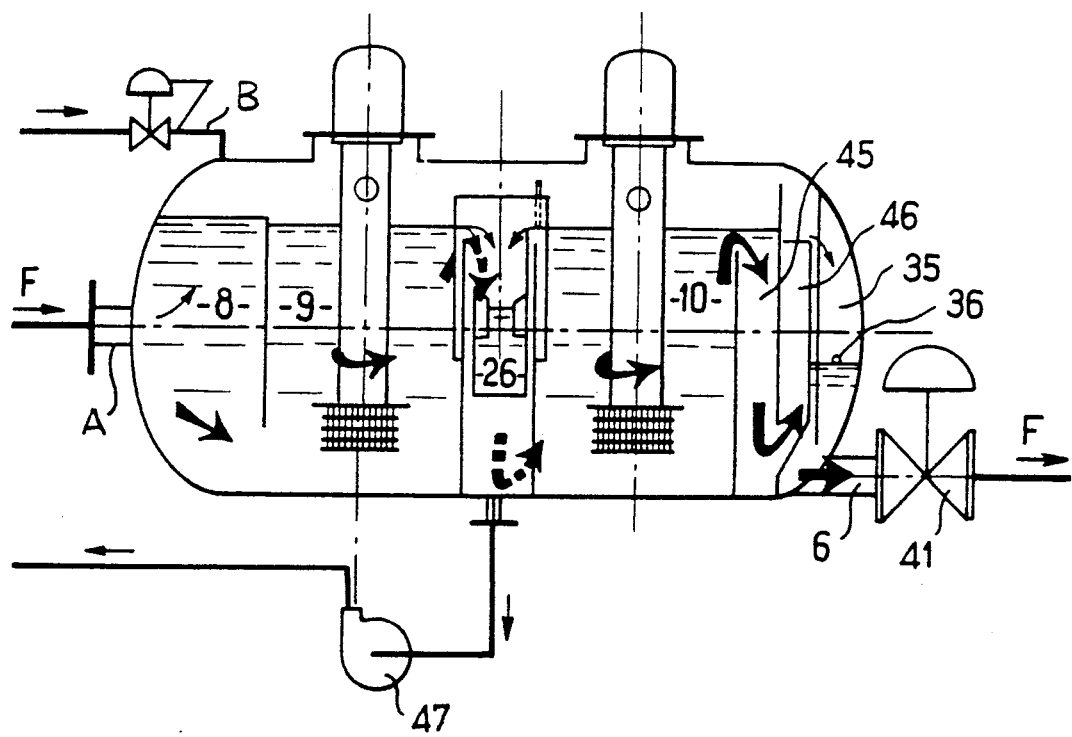
FIG_1

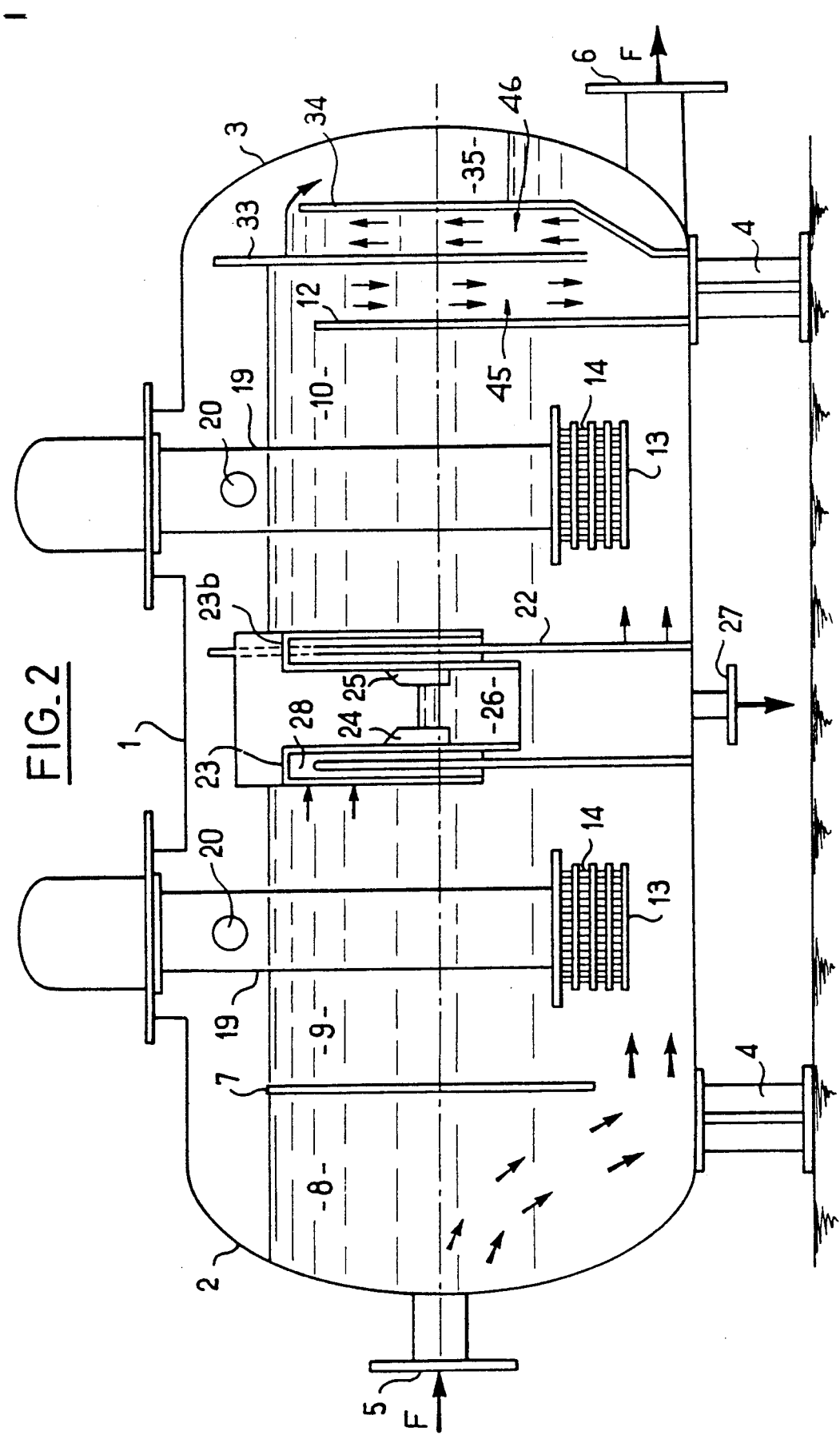

FIG._3A
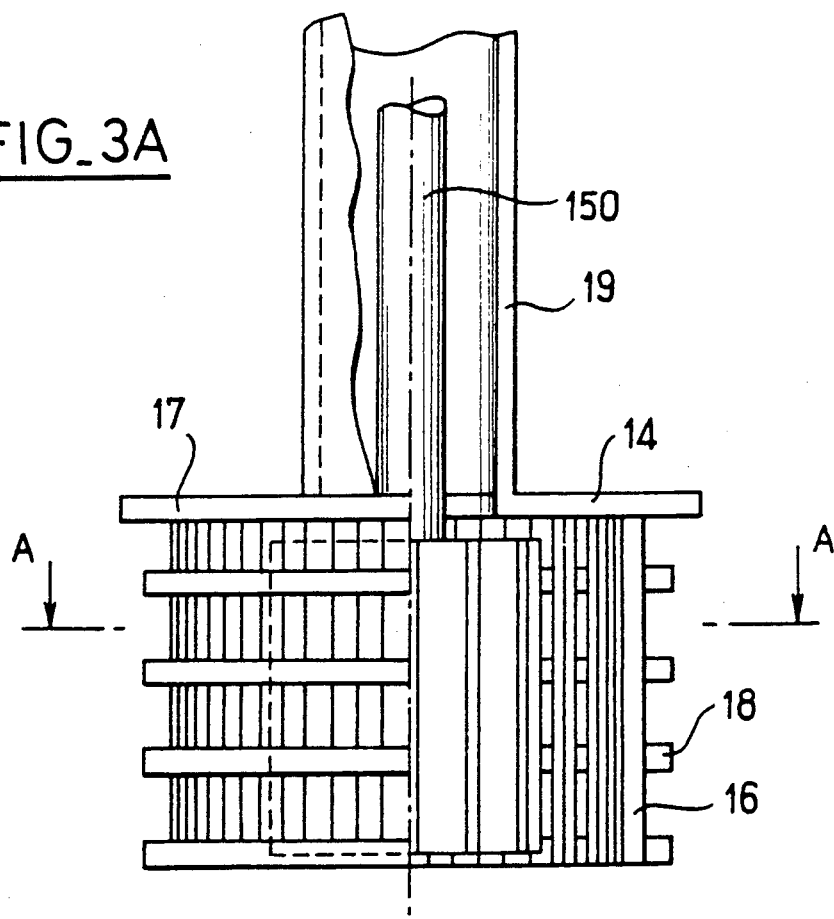
FIG._3B
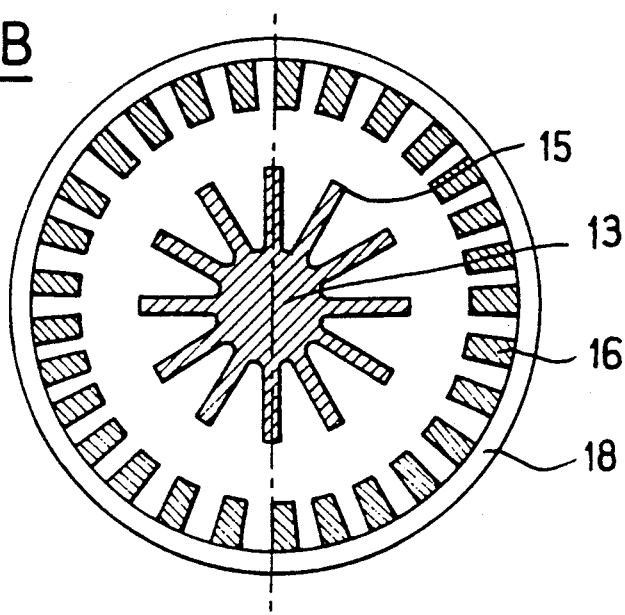

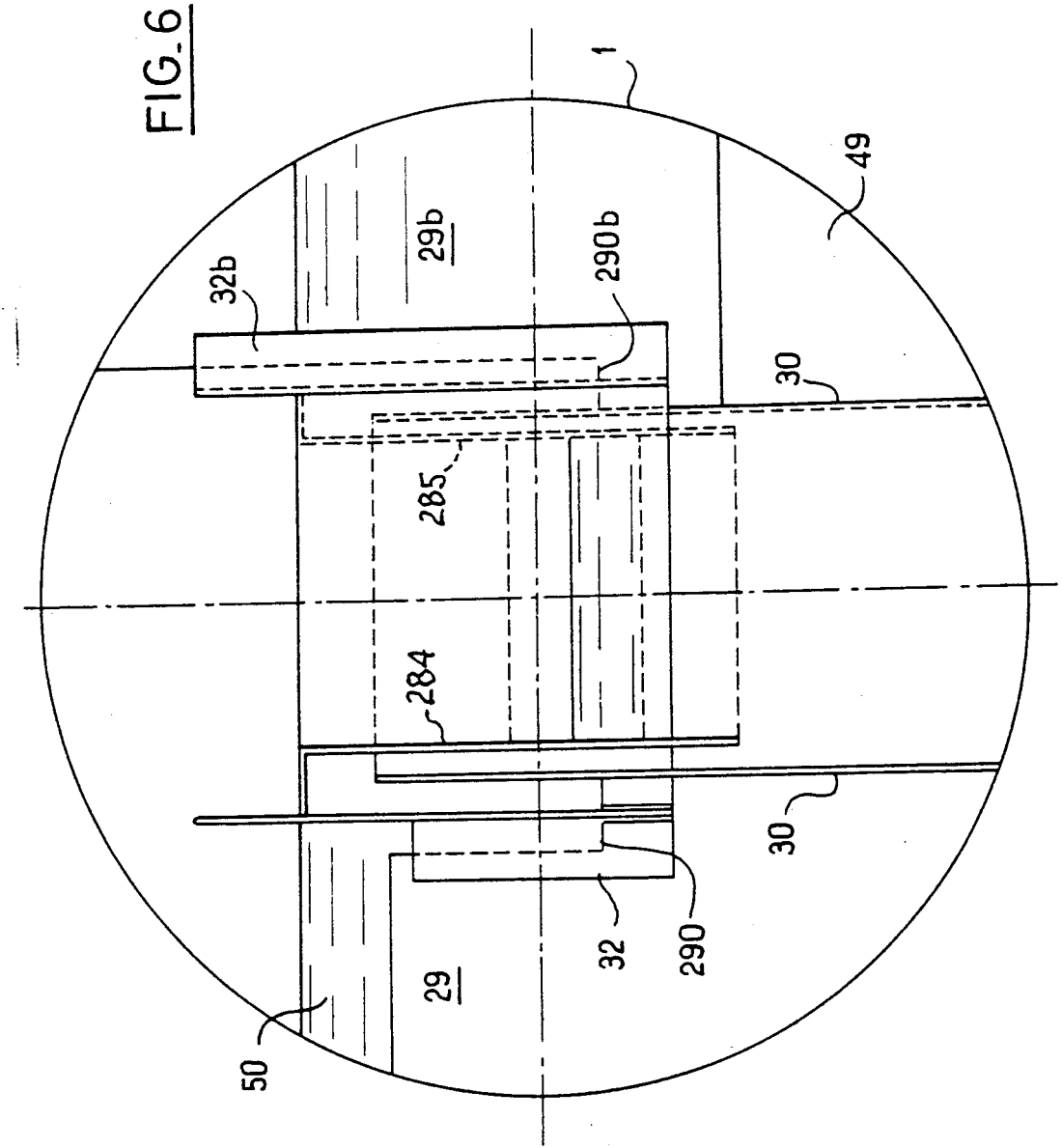

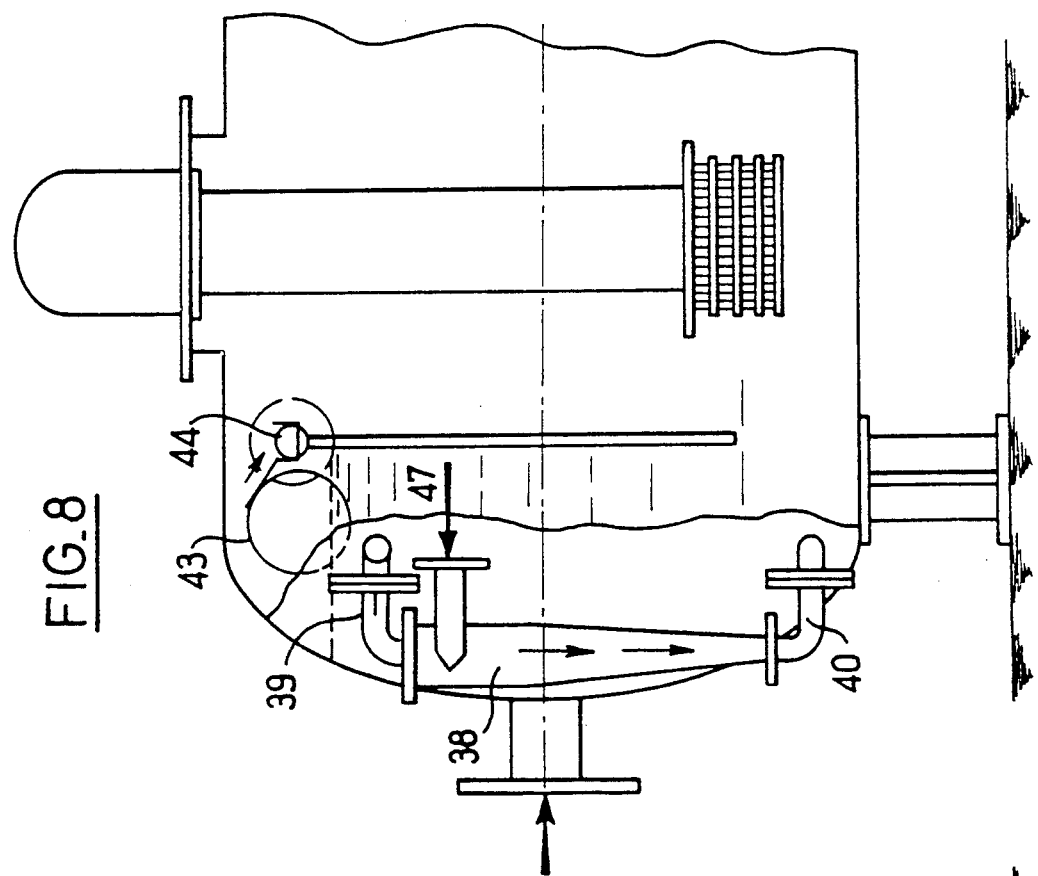
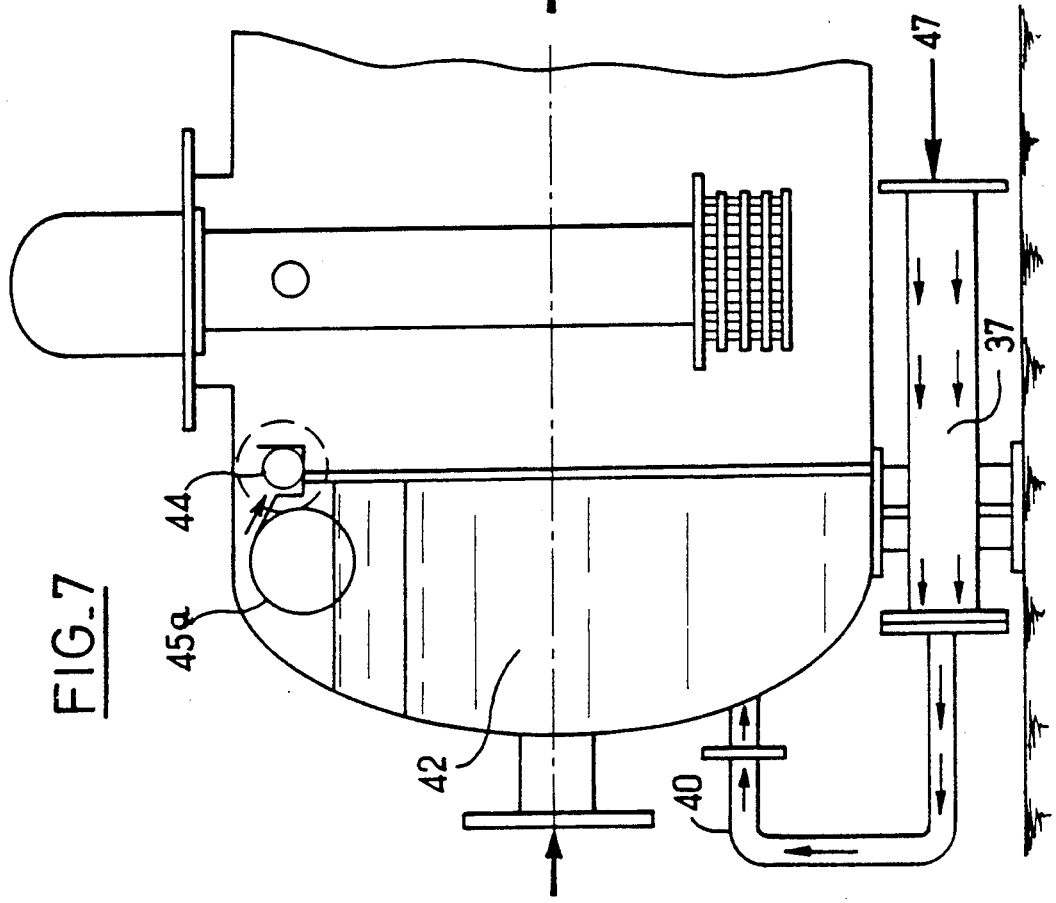

SEPARATOR FOR TWO NON-MISCIBLE LIQUIDS

This is a continuation of application Ser. No. 116,318, filed Nov. 4, 1987, now abandoned.

The present invention relates to a separator for two liquids which are not miscible, particularly for the continuous separation of hydrocarbons in emulsion in water.

In the field of oil separation from production waters, floatation treatment is frequently used. Floatation is carried out either by dissolved air or gas or by induced air or gas. The invention employs the principle of induced air or gas floatation and in particular is adapted to the treatment of petroleum deposit waters in crude petroleum production areas, either on offshore platforms or in oil fields.

BACKGROUND OF THE INVENTION

Already known from Patent Application FR No. 2 177 581 is a means of separating waters polluted by hydrocarbons comprising a buffer tank acting as a pre-separator and comprising a central tube mounted telescopically and provided at its end with a funnel connected to floats. This funnel is intended to recover the floating hydrocarbons. However, the position of the skimming float, which causes the skimming to vary, depends upon the flow values for throughput of treated water which has to be regulated and maintained accordingly. This disadvantage is unacceptable in the circumstances occurring in production fields, because of the fluctuations in the rate of flow of polluted waters. Furthermore, this document does not employ the induced air floatation technique.

It is likewise known to continuously treat waters polluted with hydrocarbons or other substances which are not miscible with water, in floatation apparatus employing induced air floatation. However, such equipment is not adapted to the petroleum industry and has particular drawbacks where security and safety are concerned, as well as in operation and processing.

Indeed, in petroleum fields, induced air floatation equipment operates under a gas covering so as to avoid contact with oxygen for safety reasons. The reservoirs or capacities are therefore subject to hydrostatic pressure due to the liquid and the pressure of the gas covering which is around 20 to 30 mbars. The floatation equipment according to the prior art is of parallelepiped shape and is constructed to withstand pressures of around 100 to 200 mbars. In oil fields, having regard to fluctuations in water production, and having regard to the lack of viability of certain control elements (water-/oil interface detector), pressures of plural bars may be observed at the input to the floatation equipment. These pressures can give rise to considerable leakage of liquid and gases or may even result in complete destruction of the equipment. When it is known that the petroleum gases may contain toxic products (for example H2S), it will be appreciated that such a risk of leakage is unacceptable.

At operating level, induced air floatation equipment requires fine regulation of the internal liquid level since this level determines the skimming rate of the foam involved. Having regard to fluctuations in flow in oil fields, it is difficult to maintain the internal level within an acceptable range of variation and furthermore to check that the adjustment has been correctly made.

Finally, having regard to the difficulties in regulation set out hereinabove, it is necessary at processing level to have a considerable rate of skimming, generally more than 10% of the flow through the equipment. The skimmed liquid carrying an oily foam and containing a floatation adjunct (a polyelectrolyte) has to be recycled, which on the one hand reduces the nominal rate of flow of the processing chain while on the other it opposes the primary separation of oils by the presence of floatation additives in gravity separators.

SUMMARY OF THE INVENTION

An object of the present invention is to provide a separator of improved output.

This first object is achieved by the fact that the separator for two liquids which are not miscible is composed of a cylindrical casing in which there are active and passive reservoirs or capacities, the passive capacities being disposed at each of the ends of the direction of circulation of liquid in the cylindrical casing and serving as a tranquilizing zone, a decantation zone, or a buffer zone, at least two active capacities being connected by a common skimmer disposed in the center of the cylindrical casing, the active capacities being disposed between the assembly adapted to carry out separation by induced air or gas.

A second object of the invention is to provide a separator of improved safety.

The second object is achieved by the fact that over and above the foregoing characteristic features, the separator operates under a gas covering.

According to another feature, in order to improve the efficiency of the separator, the active cells or capacities therein are equipped in their center with a vertical induced air floatation assembly having a stator and a rotor, the rotor having flat vertical blades, the stator entirely covering the rotor and consisting of fingers of rectangular cross-section disposed regularly around the periphery of the rotor and parallel with the axis of symmetry of the rotor and rigid with at least two rings placed in a plane at right-angles to the axis of symmetry of the rotor.

According to another characteristic feature, in order to improve the efficiency, the assembly of finger-shaped members rigid with the stator rings have their ends rigid with an upper plate disposed at the lower end of a tube which encircles the axis of the rotor.

According to another characteristic feature, in order to improve efficiency, the active cells of the separator are separated by a skimmer comprising a movable part which has a seal fitted on a fixed part to recover the foam in both cells at once, the seal between the fixed part and the movable part being of the gas or pneumatic type, and maintained by the gas generated by the floatation process.

According to another characteristic feature, the seal is comprised of an open space bounded by the movable part, of a cross-section similar to the fixed part and orientated with the opening downwards so that the gas bubbles rising through the liquid enter this space.

Another object of the invention is to make operation easier, and is achieved by the fact that the separator operates at a constant level fixed by a threshold while the skimmer functions at a skimming level which is automatically balanced by the rate of extraction of the foam.

Lastly, an object of the invention is to provide two alternatives which make it possible to improve the efficiency of the installation.

This last mentioned object is achieved by the fact that the outlet foam is pumped into a rapid flow separator in such a way as to separate the oils in this separator by means of a selective recuperator.

According to another characteristic feature, the rapid separator is of the gravity coalescent type.

According to a final characteristic feature, the rapid separator is of the hydrocyclone type.

Further characteristic features and advantages of the invention will become more clearly manifest in the light of the following detailed description given with reference to the appended drawings which, by way of non-limitative examples, illustrate embodiments of the objects of the invention.

BRIEF DESCRIPTION OF DRAWINGS

FIG. 1 is an overall view of the separator of the invention with arrows showing the fluid circulation;

FIG. 2 is a front view in sectional of the floatation equipment according to the invention;

FIG. 3A is a front view in partial sectional of the floatation turbine;

FIG. 3B is a view in section taken along line A—A of FIG. 3A;

FIG. 6 is an end view taken on an axis at right-angles to the direction of travel of the fluid in the skimmer device;

FIG. 7 is a partial side view of an alternative embodiment of separator with a rapid separator of the gravity coalescing type, and FIG. 8 is a partial side view of another alternative separator with a rapid separator of the hydrocyclone type.

DETAILED DESCRIPTION

Figure 4:
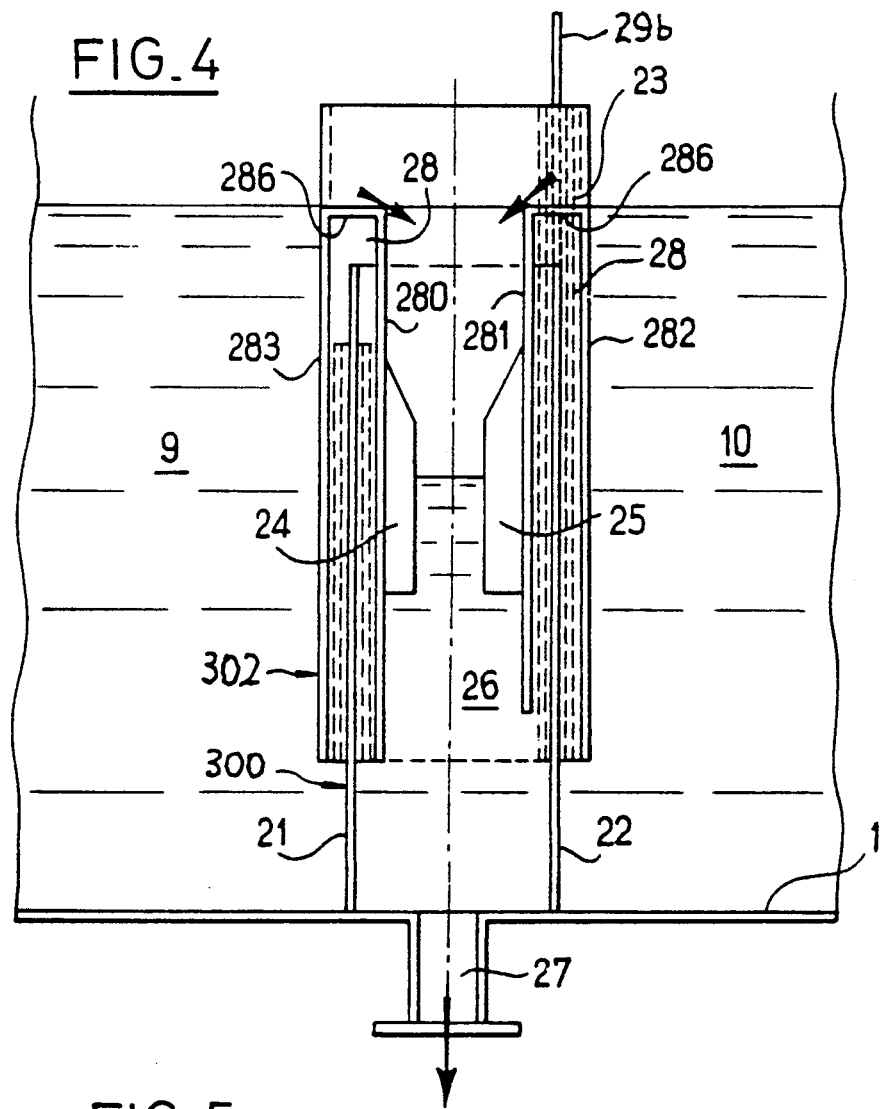
FIG. 4 is a partial enlarged front view showing the direction of flow of fluids into and from the autostable skimmer device.

The separator assembly according to the invention, shown in FIGS. 1 to 6, is composed of a cylindrical casing 1 disposed with its axis of symmetry horizontal and parallel with the direction of inlet flow F of the liquid to be treated. This cylindrical casing has dish shaped or domed ends 2 and 3, as shown at FIGS. 1 and 2. The assembly is supported by and rests on feet or cradles 4. At a first end 2 is an inlet tube or pipe 5 carrying water to be treated while at the other end 3, is the treated water outlet tube or pipe 6. Internally, the apparatus has a plurality of cells or reservoirs, generally of an even number, separated by single or double partitions. Hereinafter, the term active cells will be used to denote those cells comprising a turbine while the passive cells shall be the cells which do not have a turbine. According to the difficulty of the emulsion to be treated, the separator may comprise active cells of two, four, six or more in number, this assembly constituting the floatation equipment. Although the apparatus described comprises two active cells, it is quite clear that this number is not limitative.

As show at FIG. 2, starting from the inlet 5 of water to be treated, and in the direction of flow, there is a first single partition 7 which defines a first space 8 for calming the flow. This first space 8 constitutes a first passive cell.

Figure 5:
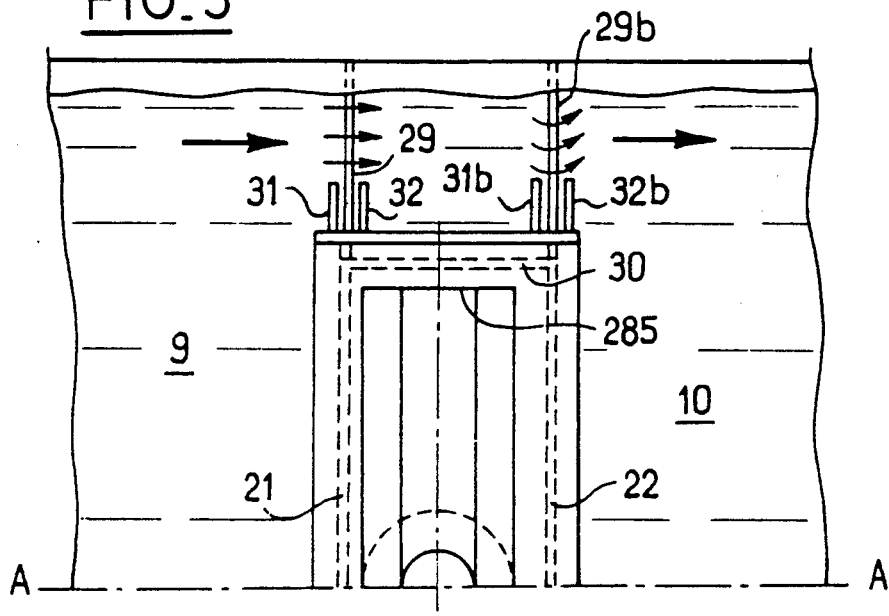
FIG. 5 is a partial enlarged top view showing the direction of flow of fluids adjacent the skimmer device and the barriers separating the two active cells or reservoirs.

Next, there are two active cells 9 and 10 separated by a double partition 29, 29b (FIGS. 5 and 6). Cell 10 is bounded by a single partition 12. In each of the active cells and in their center, is a turbine composed of a rotor assembly 13 and a stator assembly 14 having axes of symmetry of which are orientated vertically. As shown at FIGS. 3A and 3B, the rotor is composed of a plurality of flat vertical blades, the number of which will vary according to the dimension. The example shown comprises twelve rotor blades 15. The stator 14 fully covers the rotor, as can be seen in FIG. 3A. This stator consists of radially disposed fingers 16 of rectangular cross-section which have their top ends fixed to an upper plate 17 while the narrow sides of their rectangular cross-section are mounted on the interior periphery of at least two rings 18 of square cross-section which are disposed at regular intervals over the length of the fingers. The stator is extended by a tube or sleeve 19 which extends around the driving shaft 150 of the rotor and is secured to the upper plate 17. This tube 19 has openings 20 in its upper portion (FIG. 2) to allow circulation of the gases drawn in by the turbine.

The two active cells 9, 10 are separated by the double partition 29, 29b in the region in which skimming is performed. The skimmer comprises two main assemblies, a fixed portion 300 rigid with the casing 1 and a movable portion 302. The fixed portion includes two parallel partitions 21, 22 disposed normal to the direction of travel of the liquid from inlet 5 to outlet 6, which are connected to each other by walls 30 (FIGS. 5 and 6) perpendicular to these partitions, to form an upright rectangular tube 300 the bottom end of which is rigid with and sealed to the casing 1.

The partitions 29, 29b visible in FIGS. 5 and 6 extend on either side of the fixed rectangular tube of the skimmer to form the separation between the cells 9 and 10. As can be seen on FIG. 6, the downstream partition 29b is disposed in the casing so its upper end extends to the top of the casing and is thus above the level of liquid and foam, but has its bottom edge somewhat above the bottom of the casing leaving in the bottom part, bounded by the outer wall of the casing and the wall 30 of the fixed rectangular tube, a passage 49. On the other hand, the partition 29 which is upstream of the partition 29b completely occludes the space between the wall 30 of the fixed rectangular tube and the lower portion of the side wall of the casing. However, the top edge of partition 29 is below level thus leaving an upper flow passage 50 at the level of the top surface of the liquid. As is evident from FIG. 5, liquid from the cell 9 which passes to the cell 10 flows over the partition 29 and below the partition 29b.

Furthermore, these partitions 29 and 29b have respective cut-outs 290 and 290b which allow the moving part of the skimmer to move over the fixed part.

The moving part 302 of the skimmer includes an assembly of partitions 280 to 285 parallel with and on opposite sides of the respective walls and partitions 21, 22, 30 of the rectangular tube 300. The partitions 280 to 285 are spaced apart and connected together by dividers 286 secured to the top edges of these partitions to form a rectangular annulus with a closed top and open bottom and an open interior rectangular space. The open bottom is oriented toward the liquid and the closed top is oriented toward the top of the casing which contains gas. As can be seen in FIG. 1, the gas is introduced through the inlet B situated above the level of liquid which is introduced through the inlet A.

The moving part 302 forms a floating enclosure of the skimmer. On the inner walls 280 and 281 of this floating enclosure are floats 24 and 25 disposed in the open interior space 26 within the moving part 302 and the fixed rectangular tube 300. This space or capacity 26 connects with the outside via the outlet 27. A pneumatic or gas seal 28 is defined by the assembly of partitions 280 to 286 of moving part 302. As can be seen in FIG. 6, the partitions 29, 29b are rigid with the casing 1 and have their bottom portions fixed to the side walls 30 of the rectangular tube 302 which defines the space 26. Spaced baffle plates 31, 32, and 31b, 32b (FIGS. 5 and 6), bound the regions of the cut-outs 290, 290b, to avoid passages which would bypass the partitions 29 and 29b. As can be seen in FIG. 6, the partitions 31b and 32b are of such a height that they can extend beyond the maximum level of the liquid to be skimmed while the partitions 31 and 32 are of such a size that whatever happens they remain below the level of the liquid to be skimmed.

Downstream of the partition 12 rigid with the bottom of the tank 1 and bounding the end of the active cell 10, there is a siphoid partition 33 fixed at its sides to the casing 1 and of such dimensions that it does not completely occlude downward passage of liquid, but extends upwardly beyond the maximum level of liquid. With the partition 12, this partition 33 defines a space 45 which downwardly communicates with a space 46 bounded by the partition 33 and a threshold partition 34 which has its bottom and its sides fixed to the casing 1 and which is of such a height that it is lower than the maximum level of the liquid. With the bottom of casing 1 and its end 3, this partition 34, defines a passive capacity or space 35 which communicates with the outside via the outlet 6 which carries away the treated waters.

When the float is functioning under a gas covering, the level detector 36 shown in FIG. 1 makes it possible to monitor the level of liquid in the space 35 which thus serves as a hydraulic seal.

The device described operates as follows. The water to be treated enters through the inlet 5 into the tranquilizing space 8 where the oil which is not emulsified is decanted by gravity and where the fluid is capable of being degasified. The accumulated oil flows over the partition 7 but the greater part of the flow passes under this partition 7. The flow enters the active cell 9 where it is subjected to the action of air or gas floatation introduced via the rotor-stator assembly 13, 14, of the turbine. As the stator consists of rings and fingers it allows the floatation air or gas which has been introduced through the duct B and through the opening 20 in sleeve 19, into the interior volume of the stator to escape outwardly therefrom. The rotor is driven by a motor at the top of the casing at a speed to produce a vortex effect which favors the induction of air or gas which, thrown onto the stator, forms a cloud of bubbles in the liquid in the floatation apparatus. Surprisingly, it has been found that this construction of the stator, consisting of rings and fingers, makes it possible to use the efficacy of the apparatus within a ratio of 30%. Furthermore and surprisingly, employing fingers of rectangular cross-section, connected by their narrow edges to the rings 18, it is possible to eliminate the turbulent movement on the surface of the liquid which occurs if fingers of square cross-section are used.

By these floatation turbines, energy is imparted to the fluid such that the oil has a tendency to become attached to air or gas bubbles and rises to the surface in the form of foam. Foams formed on the surface of the cells 9 and 10 are skimmed via the circuit 23 of the floating part 302 of the skimmer while the water phase, freed from part of its oil, passes over and beyond the partition 29 and then passes under the partition 29b and enters the second floatation cell 10 where the same phenomenon takes place. The direction of rotation of the turbines, of the cells 9 and 10, is chosen in such a way as to be in an anti-clockwise direction in order to impart to the floating foam a movement which causes it to converge on the skimmer. The foam formed in the cell 10 is skimmed by the circuit 23b while the water passes over the partition 12 then passes under the partition 33 before passing over the threshold partition 34 to accumulate in the reservoir 35. If the floatation equipment is operating at atmospheric pressure, the water flows naturally by gravity through the outlet pipe 6. If the floatation equipment is functioning under a gas covering, the liquid level is maintained by float 36 via the valve 41 shown in FIG. 1 and mounted on the pipe 6. This arrangement maintains a virtually constant level in the space 35 which then acts as a hydraulic seal.

When the appliance is initially filled with or placed in water, care must be taken either to place the cells 9, 10 and space 26 in communication, for example through purge valves (not shown). Then as the level rises an air or gas is trapped in the zone 28 of the gas seal by the simple bell effect. Under operating conditions, this volume of air or gas is maintained by virtue of the quantity of air present in the liquid due to the floatation effect. This air is trapped in the closed top of the moving part 302 between the partitions 283, 282, and the respective partitions 21, 22 of the rectangular tube 300. When the foam has been extracted through the pipe 27, the level of liquid falls in the space 26 and the movable assembly follows this level via floats 24 and 25 until the foam floating on the surface of the cells 9 and 10 passes over the thresholds or edges 23 and 23b. When the flow of foam into space 26 is equal to the extraction flow, the movable assembly 302 is then in balance. It should be noted that by virtue of the pneumatic seal the liquid cannot pass between the fixed walls of rectangular tube 300 and the movable assembly 302 and the covering heights of the partitions forming the movable assembly and the fixed partitions are such that the pneumatic seals cannot be destroyed under conditions of variation of the movable assembly. It will be noted in addition that the operation of the device is not dependent on the evacuation flow of treated water as in the case of French Patent Application No. 2 177 581.

At this stage of the description, the apparatus is complete and is capable of functioning in many cases. In particular, when the floatation equipment is placed after a primary separator. Indeed the foam extracted by the pipe 27 either by gravity or by pumping with pump 47 in FIG. 1, may be sent back to the primary separator where they will be dehydrated. Nevertheless, it is often interesting, when one has no primary separator or when the space available is limited, to use one or two alternative embodiments as shown in FIGS. 7 and 8.

In FIG. 7, the foam taken up by the pump 47, (FIG. 1) is sent through pipes 37 and 40 towards a gravity coalescing separator offering rapid passage and constituted by a cell or space 42 provided in the cell 8 (FIG. 1) in order to permit separation of the foam. This foam, introduced via the duct 40 at a level which is below the level of input of the waters to be treated and which has traversed the cell 42 is recovered by a selective recuperator system such as, for example, an oil-absorbing drum 45*a* communicating with the outside via a pipe 44.

Another alternative embodiment resides in sending the foam pumped by the pump 47 to the input 38 of a hydrocyclone shown in FIG. 8. This input 38 is at a level which is above the height of input of the waters to be treated. The hydrocyclone returns the oil through the pipe 39 to a level above the inlet duct of waters to be treated and the water extracted from the foam via a pipe 40 to the bottom part of the cell 8. The oils floating on the surface of the cell 8 are therefore either from direct flow (whole flow, not emulsified) or foam which has undergone separation and treatment by hydrocyclone. These oils are then recovered by a selective recuperator system, for example by an oil absorbing drum 43 which communicates with the outside through a pipe 44. Thus, an extracted oil is obtained from the floatation equipment, containing virtually no water on leaving the pipe 44.

Further modifications within the scope of a man skilled in the art likewise form part of the spirit of the invention.

What is claimed is:

1. A separator for separating two liquids which are not miscible, said separator comprising; a casing comprised of active cells and passive cells, means for introducing liquid to be separated into one of the passive cells, means for removing liquid from another of the passive cells, said passive cells each comprising a tranquilizing region, said active cells being disposed between said passive cells, each of said active cells comprising a rotor-stator assembly for creating foam to perform separation of the liquids induced gas, a common skimmer disposed in a center region of the casing, said skimmer comprising a movable part having a downwardly opening annulus extending around a fixed part of corresponding configuration, a gas seal in said annulus between said fixed part and said moving part, said gas seal being maintained by induced gas created by said rotor-stator assemblies, and means for discharging liquid and foam flowing over said movable part.

2. Separator according to claim 1, wherein said casing comprises a closed casing and said separator operates under a covering of gas.

3. Separator according to claim 1, wherein each said rotor-stator assembly comprises an induced gas floatation turbine assembly disposed vertically in the center of one said active cell, said turbine assembly including a rotor comprising flat vertical blades, and a stator covering said rotor and having fingers of rectangular cross-section regularly disposed around the periphery of the rotor and parallel with the axis of symmetry of the rotor and rigid with at least two rings placed in a plane at right-angles to the axis of symmetry of the rotor.

4. Separator according to claim 3, wherein the said fingers have upper ends connected to an upper plate disposed at the lower end of a tube extending around the axis of the rotor.

5. Separator according to claim 4, further including a pump for taking up foam, a rapid throughput separator for receiving the foam from said pump and including a selective recuperator for separating the oils.

6. Separator according to claim 5, wherein the rapid throughput separator is of the gravity type.

7. Separator according to claim 5, wherein the rapid throughput separator is of the hydrocyclone type.

* * * * *